(12) United States Patent
Schuh

(10) Patent No.: US 12,255,495 B2
(45) Date of Patent: Mar. 18, 2025

(54) ROTOR LAMINATION, METHOD FOR PRODUCING A ROTOR LAMINATION AND ELECTRIC MACHINE

(71) Applicant: Siemens Aktiengesellschaft, Munich (DE)

(72) Inventor: Carsten Schuh, Baldham (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/769,659

(22) PCT Filed: Sep. 24, 2020

(86) PCT No.: PCT/EP2020/076711
§ 371 (c)(1),
(2) Date: Apr. 15, 2022

(87) PCT Pub. No.: WO2021/073847
PCT Pub. Date: Apr. 22, 2021

(65) Prior Publication Data
US 2024/0154474 A1    May 9, 2024

(30) Foreign Application Priority Data
Oct. 16, 2019  (EP) ..................... 19203668

(51) Int. Cl.
*H02K 1/22* (2006.01)
*H02K 1/02* (2006.01)
*H02K 15/02* (2006.01)
*H02K 15/12* (2006.01)

(52) U.S. Cl.
CPC ............. *H02K 1/22* (2013.01); *H02K 1/02* (2013.01); *H02K 15/02* (2013.01); *H02K 15/12* (2013.01)

(58) Field of Classification Search
CPC .................................. H02K 1/02; H02K 1/22
See application file for complete search history.

(56) References Cited

U.S. PATENT DOCUMENTS

| | | | |
|---|---|---|---|
| 2003/0063993 A1 | 4/2003 | Frederick, Jr. et al. | 419/36 |
| 2008/0042505 A1 | 2/2008 | Gerster | 310/152 |
| 2009/0273252 A1 | 11/2009 | Nakamasu et al. | 310/156.07 |
| 2018/0205273 A1 | 7/2018 | Büttner et al. | |

FOREIGN PATENT DOCUMENTS

| | | | | |
|---|---|---|---|---|
| CN | 101454961 A | 6/2009 | ............... | H02K 1/27 |
| CN | 105375655 A | 3/2016 | ............... | H02K 1/02 |
| CN | 107466435 A | 12/2017 | ............... | F16D 1/06 |

(Continued)

OTHER PUBLICATIONS

Search Report for International Application No. PCT/EP2020/076711, 14 pages, Jan. 14, 2021.

(Continued)

*Primary Examiner* — Ramon M Barrera
(74) *Attorney, Agent, or Firm* — Slayden Grubert Beard PLLC

(57) ABSTRACT

Various embodiments of the teachings herein include a rotor lamination comprising: a first material; and a second material. The first material is at least partially soft magnetic. The second material has a higher mechanical tensile strength than the first material. The first material and the second material are connected with a material bond.

6 Claims, 3 Drawing Sheets

(56) References Cited

FOREIGN PATENT DOCUMENTS

| CN | 107852046 A | 3/2018 | ............... H02K 1/24 |
|---|---|---|---|
| DE | 10 2005 034 486 | 2/2007 | ............. H02K 15/02 |
| DE | 10 2009 042 607 | 3/2011 | ............. H02K 1/27 |
| DE | 102009056854 A1 | 6/2011 | ............. H02K 15/02 |
| EP | 1 300 207 | 4/2003 | ................ B22F 7/06 |
| EP | 2768117 A1 | 8/2014 | ............... H02K 1/24 |
| EP | 2 775 591 | 9/2014 | ............... H02K 1/24 |
| JP | 2002034182 A | 1/2002 | ............... H02K 1/02 |
| JP | 3 705450 | 10/2005 | ............. H02K 19/06 |

OTHER PUBLICATIONS

Chinese Office Action, Application No. 202080071900.9, 10 pages, Dec. 11, 2023.

ROTOR LAMINATION, METHOD FOR PRODUCING A ROTOR LAMINATION AND ELECTRIC MACHINE

CROSS-REFERENCE TO RELATED APPLICATIONS

This application is a U.S. National Stage Application of International Application No. PCT/EP2020/076711 filed Sep. 24, 2020, which designates the United States of America, and claims priority to EP Application No. 19203668.9 filed Oct. 16, 2019, the contents of which are hereby incorporated by reference in their entirety.

TECHNICAL FIELD

The present disclosure relates to electric machines. Various embodiments of the teachings herein include rotor laminations, methods of manufacturing a rotor lamination, and/or electric machines.

BACKGROUND

Magnetic sheets for electric machines can now be manufactured using screen printing and/or stencil printing. Here, a metal powder is first processed into a printing paste, and this printing paste is then processed into a green body, i.e. a thick film, by means of screen and/or stencil printing. The green body is then sintered by means of thermal treatment, i.e. by binder removal and sintering, to produce a structured metallic sheet.

In particular, magnetic sheets made of pure iron can be easily produced in this way. However, for magnetic sheets in the form of rotor laminations, which are to be used at high setpoint speeds and/or which are to be operated at rapidly changing speeds, the mechanical properties of pure iron are inadequate. In particular, the tensile strength of pure iron is often insufficient to withstand the centrifugal forces and other acceleration forces that occur. Nevertheless, the soft magnetic properties of pure iron are particularly good compared to alternative materials.

SUMMARY

The teachings of the present disclosure include improved rotor laminations that can withstand in particular high speeds and rapid changes in speed, as well as having sufficiently good magnetic properties. For example, some embodiments of the teachings herein include a rotor lamination (10, 310, 410, 510) having at least a first material (30) and a second material (50), in which the first material (30) is at least partially soft magnetic and the second material (50) has a higher mechanical tensile strength than the first material (30), wherein the first material (30) and the second material (50) are connected with a material bond, in particular sintered together.

In some embodiments, the first material (30) is pure iron and/or the second material (50) is a steel.

In some embodiments, the first material (30) and the second material (50) differ from one another in respect of their coefficients of thermal expansion by no more than $10 \cdot 10^{-6}$/K, preferably by no more than $5 \cdot 10^{-6}$/K, suitably by no more than $2 \cdot 10^{-6}$/K, ideally by no more than $1 \cdot 10^{-6}$/K.

In some embodiments, the first (30) and second material (50) are connected to one another with a positive fit.

In some embodiments, the rotor lamination (10, 310, 410, 510) has a circular geometry and/or rotational symmetry and the second material forms radially extending struts (60, 70) which taper in the radial direction (R), in particular at a radially outer end.

In some embodiments, the first material (30) has grooves (40) within which the second material is located.

In some embodiments, the second material (50) is disposed on both sides of the first material (30).

As another example, some embodiments include a method for manufacturing a rotor lamination as claimed in one of the preceding claims, in which the first material (30) and second material (50) are connected to one another with a material bond, in particular co-sintered.

In some embodiments, the first material (30) is initially produced as a green part and subsequently the second material (50) is applied to the first material (30) and the first (30) and second material (50) are then co-sintered, or the second material (50) is initially produced as a green part and subsequently the first material (30) is applied to the second material (50) and then the first (30) and second material (50) are co-sintered.

In some embodiments, firstly, the first material (30) is produced as a green part and the second material (50) is produced as a green part, and thereafter first (30) and second material (50) are connected to one other with a positive fit, in particular laminated, and subsequently co-sintered.

In some embodiments, the green part or parts is/are produced by means of tape casting and/or by means of screen and/or stencil printing and/or by means of slip casting and/or by means of punching and/or water jet cutting and/or hot stamping and/or binder jetting and/or by means of additive manufacturing.

In some embodiments, one of first (30) and second material (50) is applied to another of first (30) and second material (50) by means of tape casting and/or by means of screen and/or stencil printing and/or by means of slip casting and/or by means of punching and/or water jet cutting and/or hot stamping and/or binder jetting and/or by means of additive manufacturing and/or by means of spraying and/or roll coating.

As another example, some embodiments include an electric machine, in particular a motor and/or generator, having a rotor lamination (10, 310, 410, 510) as described herein.

BRIEF DESCRIPTION OF THE DRAWINGS

The teachings herein are explained in more detail with reference to exemplary embodiments illustrated in the accompanying drawings in which.

DETAILED DESCRIPTION

Figure 1:
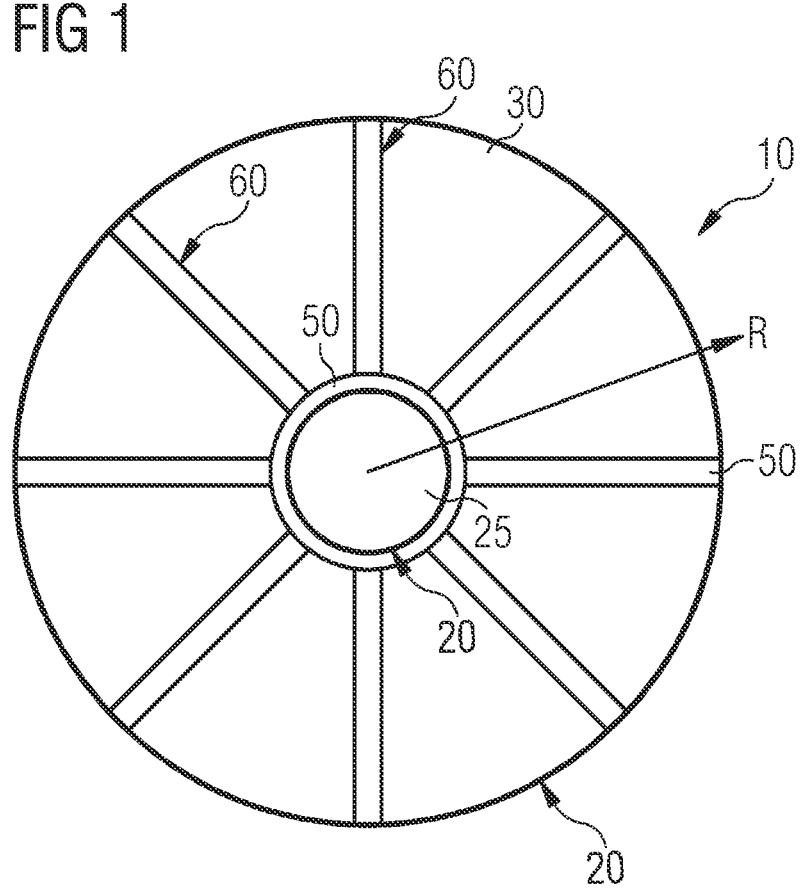
FIG. 1 shows a schematic plan view of a rotor lamination incorporating teachings of the present disclosure, comprising a first and a second material.
Figure 2:
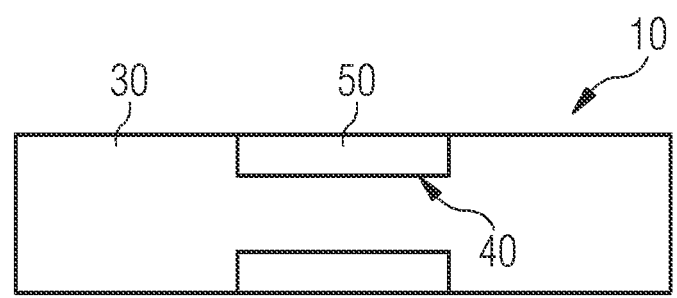
FIG. 2 shows a schematic cross-section of the rotor lamination as shown in FIG. 1.

In some embodiments, a rotor lamination incorporating teachings of the present disclosure comprises at least a first material and a second material, the first material being at least partially soft-magnetic and the second material having a higher mechanical tensile strength than the first material, wherein the first and second materials are connected with a material bond to one another, in particular sintered together. In practical terms, sintered together is to be understood in the sense of co-sintered.

In this way, the rotor lamination is a sintered product which has both a sufficiently high mechanical tensile strength to reliably withstand high rotor speeds and also sufficiently good soft magnetic properties to produce a rotor lamination which can be used in a high-performance electric machine. The rotor lamination can advantageously be produced using a wide range of magnetically active materials for the first material and/or mechanically stabilizing materials for the second material. In addition, there is a wide degree of freedom for shaping the first material and the second material. In some embodiments, the rotor lamination can also be designed in a structurally conformal manner, i.e. no significant reduction in the first soft magnetic material compared to conventional rotor laminations is necessary.

In some embodiments, the first material comprises pure iron and/or the second material comprises a steel. Steel possesses a particularly high mechanical tensile strength. Pure iron is magnetically soft.

In some embodiments, the first material and the second material differ from one another in respect of their coefficients of thermal expansion by no more than $10 \cdot 10^{-6}$/K, by no more than $5 \cdot 10^{-6}$/K, by no more than $2 \cdot 10^{-6}$/K, and/or by no more than $1 \cdot 10^{-6}$/K. In this way, the stability of the mechanical jointing is ensured both during sintering itself and during operation.

In some embodiments, the first and second materials are connected with a positive fit to one another. In this development, the union of the first and second materials may be additionally stabilized by means of the connection with a positive fit.

In some embodiments, the rotor lamination has a circular geometry and/or rotational symmetry, and the second material forms radially extending struts which taper in the radial direction, in particular at a radially outer end.

In some embodiments, the second material assumes a smaller proportion by mass and/or volume than the first material. In this development, the magnetic properties of the rotor lamination are largely dominated by the first material, while the second material can be limited to a proportion by volume or mass that is sufficient for mechanical stability.

In some embodiments, the first material has grooves within which the second material is located. In some embodiments, the first and second materials have a planar surface finish.

In some embodiments, the second material is suitably disposed on both sides of the first material.

In some methods for manufacturing a rotor lamination, the first and second material are co-sintered. In some embodiments, the first material is initially produced as a green part and subsequently the second material is applied to the first material, after which the first and second material are co-sintered. In some embodiments, the second material is first produced as a green part and subsequently the first material is applied to the second material, after which the first and second materials are co-sintered.

In some embodiments, the first material is initially manufactured as a green part and subsequently the second material is manufactured as a green part, thereafter the first and second material are connected to each other with a positive fit, in particular laminated, and the first and second material are then co-sintered. In this development, the first and second material can each be prefabricated as a green part, so that there is a particularly high degree of freedom in terms of shaping.

In some embodiments, the green part or parts is/are manufactured by means of tape casting and/or by means of screen printing and/or stencil printing and/or by means of slip casting and/or by means of punching and/or water jet cutting and/or hot stamping and/or binder jetting and/or by means of additive manufacturing. The aforementioned manufacturing process or processes are known means of producing green parts, so that in principle conventional manufacturing processes can be used as far as possible for carrying out the methods described herein. In some embodiments, the methods can be carried out cost-effectively and at scale.

In some embodiments, a material from the group of first and second materials is applied to another material from the group of first and second materials by means of tape casting and/or by means of screen and/or stencil printing and/or by means of slip casting and/or by means of punching and/or water jet cutting and/or hot stamping and/or binder jetting and/or by means of additive manufacturing and/or by means of spraying and/or roll coating.

In some embodiments, an electric machine is a motor and/or generator and has a rotor lamination as described above and/or a rotor lamination produced by means of a method as previously described.

The rotor lamination 10 shown in FIG. 1 has an essentially annular cross-sectional contour 20 and forms a mathematical perpendicular cylinder with an annular base. The outer radius of the annular base is at least one order of magnitude greater than the thickness of the cylinder. The rotor lamination 10 has a central bushing 25 extending therethrough in the direction of a cylinder axis of the annularly cylindrical shape of the rotor lamination 10. The bushing 25 is designed to pass through a rotor shaft to which the rotor lamination 10 can be connected.

The rotor lamination 10 comprises a first material 30 made of magnetically soft pure iron. On its two annular sides facing away from each other, the first material 30 has grooves 40 within which a second material 50 is located. In the exemplary embodiment shown, the second material 50 is made of steel, which has a significantly higher mechanical tensile strength than pure iron. Said second material 50 lies flat and flush with the first material 30 on the circular sides of the rotor lamination 10.

The second material 50 of the rotor lamination 10 surrounds the bushing 25 in an annular manner, on the one hand, and also extends radially from the bushing 25 with eight spokes 60 in a star-like manner to the outer circumference of the annular cross-sectional contour 20. In some embodiments, a different number of spokes can also be present in each case.

In the exemplary embodiment shown in FIG. 1, the spokes 60 made of the second material 50 extend with a constant width in a direction perpendicular to the radial direction R and parallel to the annular sides of the rotor lamination 10. In the exemplary embodiment of a rotor lamination 310 shown in FIG. 3, the spokes 70 can also taper in the radial direction.

Figure 3:
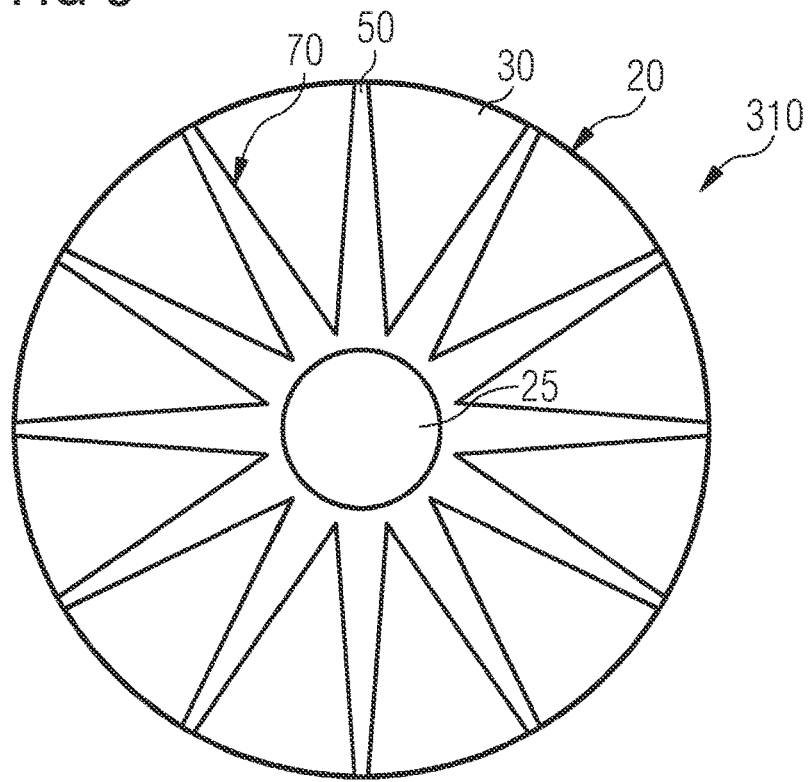
FIG. 3 shows a schematic plan view of another exemplary embodiment of a rotor lamination incorporating teachings of the present disclosure.
Figure 4:
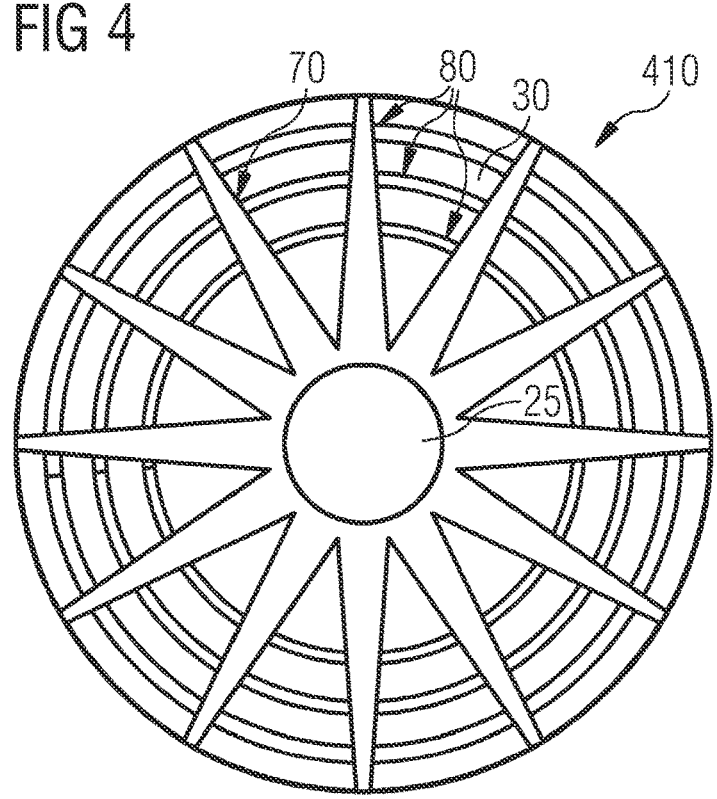
FIG. 4 shows a schematic plan view of another exemplary embodiment of a rotor lamination incorporating teachings of the present disclosure.

In the exemplary embodiment of a rotor lamination 410 shown in FIG. 4, in addition to the spokes 70 tapering in the radial direction R as shown in FIG. 3, there are also a plurality of concentric rings 80 of second material (three in the embodiment according to FIG. 4) which are also located in grooves 40 of the first material 30.

In some embodiments, the rotor laminations 10, 310, 410 shown in FIGS. 1 to 4 are manufactured by initially producing the first material 30 as a green part by means of screen and/or stencil printing. Said green part is formed from the first material 30 in such a way that it has grooves 40. The second material 50 is then introduced into these grooves 40 by spraying. Thereafter, the first material 30 and the second material 50 are sintered together. In some embodiments, the first material 30 can be produced as a green part by means of tape casting and/or by means of slip casting and/or by means of punching and/or water jet cutting and/or hot stamping and/or binder jetting and/or by means of additive manufacturing.

In some embodiments, the second material 50 can be applied to the first material by means of roll coating or by means of any of the manufacturing methods mentioned in the preceding paragraph with regard to the first material 30.

In some embodiments, the first material 30 and the second material 50 can each be produced as a green part. The second material 50 is then introduced into grooves 40 of the first material 30 and the first 30 and second material 50 are sintered together.

Figure 5:
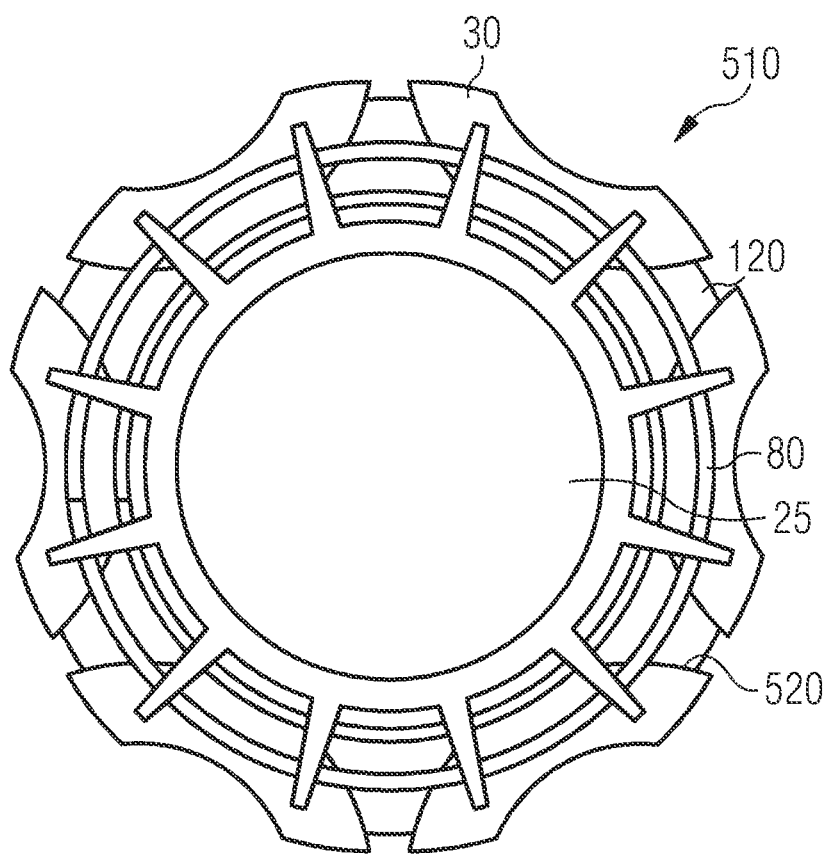
FIG. 5 shows a schematic plan view of another exemplary embodiment of a rotor lamination incorporating teachings of the present disclosure.

In the exemplary embodiment shown in FIG. 5, in addition to the first magnetically soft material and the second material having a higher tensile strength than the first material, a third material 120 is also provided, wherein the third material 120 forms a non-magnetic support structure of the rotor lamination 510. The first 30 and the third material 120 form a two-component magnetic lamination 520, for which the second material 50 provides additional stabilization of the two-component magnetic lamination 520. Thus, in the rotor lamination 510, the two-component magnetic lamination 520 takes the place of the first material 30 of the previously described exemplary embodiments.

The invention claimed is:

1. A rotor lamination comprising:
a disk with a set of radial grooves on both faces, the disk comprising a first material; and
a second material disposed in each of the set of radial grooves;
wherein the first material is at least partially soft magnetic;
the second material has a higher mechanical tensile strength than the first material; and
the first material and the second material are connected with a material bond.

2. The rotor lamination as claimed in claim 1, wherein the first material comprises pure iron.

3. The rotor lamination as claimed in claim 1, wherein the first material and the second material differ from one another with respect to respective coefficients of thermal expansion by no more than $10 \cdot 10-6/K$.

4. The rotor lamination as claimed in claim 1, wherein the first and second material are connected to one another with a positive fit.

5. An electric machine comprising:
a rotor lamination having:
a disk with a set of grooves on both faces, the disk comprising a first material; and
a second material disposed in each of the set of grooves;
wherein the first material is at least partially soft magnetic;
the second material has a higher mechanical tensile strength than the first material; and
the first material and the second material are connected with a material bond.

6. The rotor lamination as claimed in claim 1, wherein the second material comprises a steel.

* * * * *